United States Patent [19]

Hanson et al.

[11] Patent Number: 4,897,750
[45] Date of Patent: Jan. 30, 1990

[54] ENCODABLE INSERT FOR A RECORDING CASSETTE

[75] Inventors: Robert L. Hanson; John E. Dunstan, both of St. Paul, Minn.

[73] Assignee: Minnesota Mining and Manufacturing Company, St. Paul, Minn.

[21] Appl. No.: 191,341

[22] Filed: May 9, 1988

[51] Int. Cl.<sup>4</sup> ............................................. G11B 23/04
[52] U.S. Cl. .................................................. 360/132
[58] Field of Search ................ 360/132, 133; 242/198

[56] References Cited

U.S. PATENT DOCUMENTS

| | | | |
|---|---|---|---|
| 3,721,772 | 3/1973 | Miura et al. | 360/132 |
| 4,012,011 | 3/1977 | Saito | 360/132 |
| 4,044,386 | 8/1977 | Satou et al. | 360/60 |
| 4,320,422 | 3/1982 | Rinkleib | 360/132 |
| 4,348,707 | 9/1982 | Maly et al. | 360/132 |
| 4,628,713 | 12/1986 | Cecchi et al. | 360/132 |
| 4,633,354 | 12/1986 | Oishi et al. | 360/132 |
| 4,743,984 | 5/1988 | Ryan | 360/132 |

Primary Examiner—Tupper Robert S.
Attorney, Agent, or Firm—Donald M. Sell; Walter N. Kirn; David W. Anderson

[57] ABSTRACT

Digital videocassettes are encoded by punching out breakaway tabs to permit a sensing mechanism on a recorder to identify key characteristics of each cassette. The encoding can be changed when the breakaway tabs are carried by an insert that can be removably affixed to the cassettes. By employing such an insert, a number of problems are avoided such as possible contamination of the cassette and/or recorder by loose tabs. The tabs of the insert do not need to be breakaway when the inserts are initially formed to provide desired codes.

8 Claims, 1 Drawing Sheet

ENCODABLE INSERT FOR A RECORDING CASSETTE

BACKGROUND OF THE INVENTION

1. Field of the Invention

The invention concerns the encoding of recording cassettes to permit a sensing mechanism on a recorder to identify certain characteristics of each cassette.

2. Description of the Related Art

Specifications are being promulgated by Society of Motion Picture and Television Engineers for a digital videocassette that is being developed internationally. The specifications call for four passages or "coding holes" in an area between curved walls that form part of the enclosure for the tape reels. Each of the coding holes can be either blocked or unblocked, thus permitting a sensing mechanism on the recorder to determine key characteristics of the magnetic recording tape housed in the cassette. The four coding holes allow for sixteen differences in the magnetic recording tape. Differences currently contemplated for encoding include the thickness of the magnetic recording tape and the type of magnetizable material in the tape.

In digital videocassettes that have been publically shown, the coding holes are initially blocked by breakaway tabs molded into the base or body of the cassette. After selected tabs have been broken out, the cassette can no longer be used with a different magnetic recording tape. If the tabs are not broken away until the cassette has been assembled, there is a danger that a tab might become lodged in the cassette and later come loose to damage either the cassette or a recorder.

Digital videocassettes that have been made in accordance with the aforementioned specifications can be used for recording digital data, and in such use it may be desired to use the coding holes for any of a number of purposes, e.g, to allow a recorder to identify the use to which the cassette has been put.

If the body of a cassette is encoded during assembly, a station to do so must be added to the assembly line, and if a mistake is made in the encoding, the miscoded cassettes might need to be destroyed. If there is a need to change the type of tape during production and hence to change the encoding, the line must be stopped until this is done.

SUMMARY OF THE INVENTION

The invention avoids the foregoing problems by the simple and economical expedient of incorporating coding holes into an insert which can be attached to a digital videocassette and, when desired, detached to permit the encoding to be changed. Briefly, this is accomplished by (1) an insert formed with a plurality of coding holes, the insert including means for either blocking or unblocking each of the coding holes, and (2) means for detachably fixing the insert to the cassette.

By forming the coding holes in an insert instead of in the body of a digital videocassette, a number of economies can be realized. For example, if the body of a cassette is to be encoded before its assembly, there are inventory problems that are avoided by the use of an insert, because every cassette can be identical. Furthermore, the use of encoded inserts permits the type of tape in a cassette to be changed, a procedure not feasible in the prior art because of the inability to change a coding.

As in prior digital videocassettes, the blocking/unblocking means preferably is provided by a breakaway tab at each of the coding holes. However, the tabs of the insert do not need to be breakaway when the inserts are initially formed to provide desired codes. Initially encoded inserts are feasible, because it is easy to stockpile inserts of various codes. By molding the inserts to have a unique color for each code, the chance of miscoding should be virtually eliminated.

DETAILED DISCLOSURE

A preferred insert of the invention is of generally triangular shape to fit into a fork between curved walls that form part of an enclosure for two reels of magnetic recording tape. A flange projects from each of those curved walls and is gripped between at least two lugs projecting from each side of the insert. A thin membrane or breakaway tab blocks each of four coding holes formed in the insert. To unblock one of the coding holes, its breakaway tab is broken out.

THE DRAWING

The invention may be more easily understood in reference to the drawing, both figures of which are schematic. In the drawing.

Figure 2:
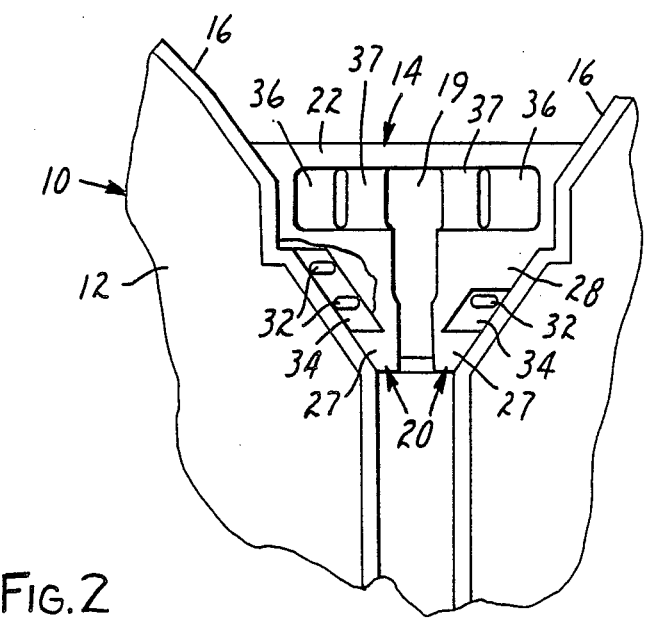
FIG. 2 is fragmentary plan view of the underside of a digital videocassette showing an affixed insert of FIG. 1.

The digital videocassette 10 of FIG. 2 has a broad bottom wall 12 to which has been attached an insert 14. The insert 14 is of generally triangular shape to fit into a fork between walls 16 that typically are curved and help enclose a pair of reels of magnetic recording tape (not shown), it being in this position that the aforementioned specifications locate four coding holes, two on either side of a central "user hole" 19.

Figure 1:
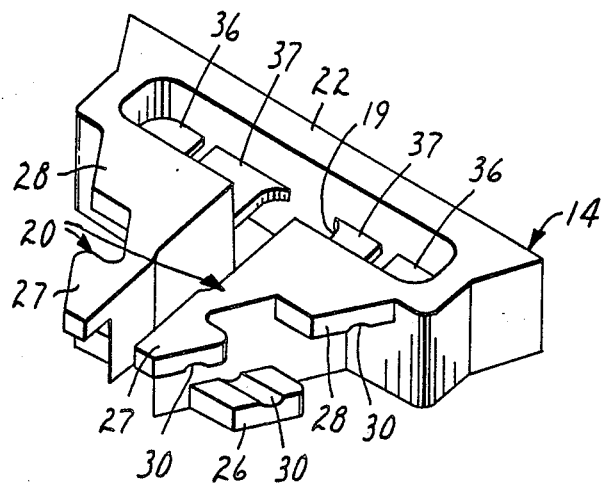
FIG. 1 is a perspective view of an insert of the invention.

As seen in FIG. 1, the insert 14 has a generally triangular perimeter and is bifurcated to provide clearance for mechanism associated with the user hole 19. The bifurcation results in two legs 20, each a mirror image of the other and interconnected by a bridge 22. Projecting from each leg of the insert is a lug 26 which is offset from a pair of lugs 27 and 28 that project from each leg adjacent the opposite face of the insert. Such offsetting is desirable to enhance plastic molding of the insert. When the insert is seated in the fork between the walls 16, a groove 30 in each of the lugs mates with one of three ribs 32 (some shown) projecting from each face of each of a pair of flanges 34 that project from the walls 16, thus securely fixing the insert to the cassette. There is an identical set of three ribs (not shown) on the underside of each of the flanges 34 so that the insert can be inverted. For lateral support, the bridge 22 rests against a span (not shown) between the walls 16.

Extending between the bridge 22 and each of the legs 20 are two thin membranes 36 and 37, each of which serves as a breakaway tab to open as many as four coding holes. In large-scale production, a large number of identical cassettes would be produced at one time, and to each would be affixed one of a batch of inserts 14 that had been uniformly encoded either (1) by breaking out or by not breaking out each of the membranes 36 and 37 or (2) by molding the insert with or without those membranes.

While the insert 14 is removable to permit the code to be changed, it is immaterial whether the insert would be destroyed in doing so, because another insert would be used to change the code.

EXAMPLE 1

The digital videocassette 10 of FIG. 2 has been constructed by molding the walls of the cassette of ABS (acrylonitrile/butadiene/styrene) resin and by molding the insert 14 of acetal resin. Key dimensions are:

| | |
|---|---|
| Thickness of insert 14 | 4.5 mm |
| Length of insert 14 in direction of legs | 12.0 mm |
| Length of bridge 22 | 17.6 mm |
| Thickness of lugs 26, 27 and 28 | 1.0 mm |
| Depth of groove 30 | 0.25 mm |
| Height of ribs 32 | 0.3 mm |
| Thickness of membranes 36 and 37 | 0.5 mm |

After the insert 14 is in place, it and the elements to which it is affixed are under very little tension. Hence there should be substantially no plastic flow so that the insert should outlast the life of the videocassette.

We claim:

1. An encodable recording cassette comprising:
   an insert formed with a plurality of coding holes, the insert including means for either blocking or unblocking each of the coding holes, and
   means for detachably fixing the insert to the cassette.

2. A recording cassette as defined in claim 1 wherein each of said blocking/unblocking means comprises a breakaway tab.

3. A recording cassette as defined in claim 2 wherein said insert is bifurcated to provide two legs, each a mirror image of the other and interconnected by a bridge.

4. A recording cassette as defined in claim 3 wherein the cassette has a pair of ribbed flanges, and at least two lugs project from each leg of the insert to grip the ribbed flanges to secure the insert to the cassette.

5. A recording cassette as defined in claim 4 wherein the face of each lug which contacts a flange is formed with a groove that mates with a rib on one of the flanges.

6. A recording cassette as defined in claim 5 and having a pair of walls that enclose a pair of reels of magnetic recording tape housed side by side in the cassette, and each of said flanges projects from one of the pair of walls.

7. A recording cassette as defined in claim 6 wherein said pair of walls intersect at a fork, and the insert is generally triangular to fit into that fork.

8. A recording cassette as defined in claim 6 wherein at least one membrane extends between the bridge and each of the legs, each membrane serving as a breakaway tab to open coding holes as desired.

* * * * *

UNITED STATES PATENT AND TRADEMARK OFFICE
CERTIFICATE OF CORRECTION

PATENT NO. : 4,897,750

DATED : January 30, 1990

INVENTOR(S) : Robert L. Hanson and John E. Dunstan

It is certified that error appears in the above-identified patent and that said Letters Patent is hereby corrected as shown below:

Column 4, Claim 8, line 24, correct "claim 6" to --claim 3--.

Signed and Sealed this

Sixteenth Day of April, 1991

Attest:

HARRY F. MANBECK, JR.

Attesting Officer

Commissioner of Patents and Trademarks